April 28, 1942.   R. W. DU VAL   2,281,422
CUTTING MACHINE
Filed Aug. 29, 1941   3 Sheets-Sheet 1
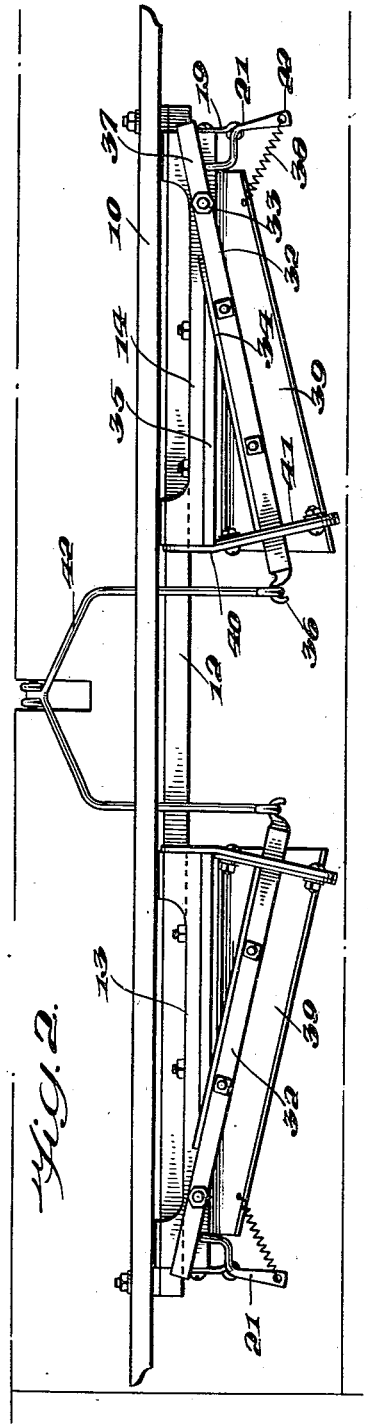
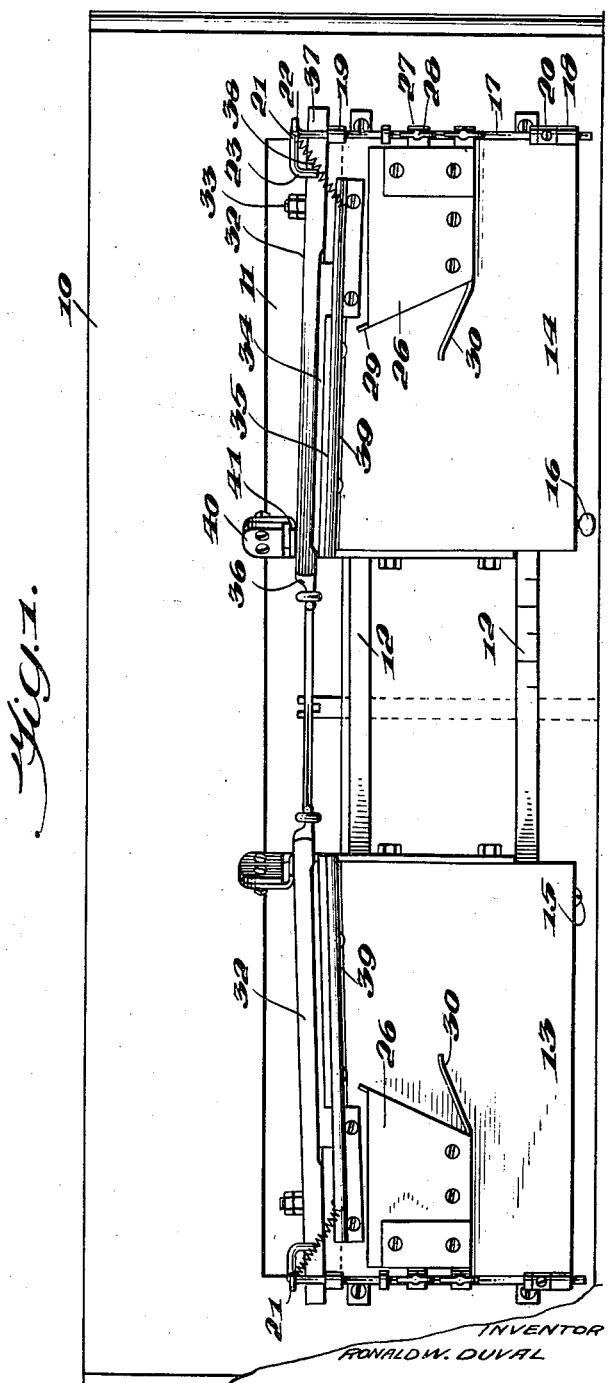
INVENTOR
RONALD W. DUVAL
By Riordan & Riordan
Attorney

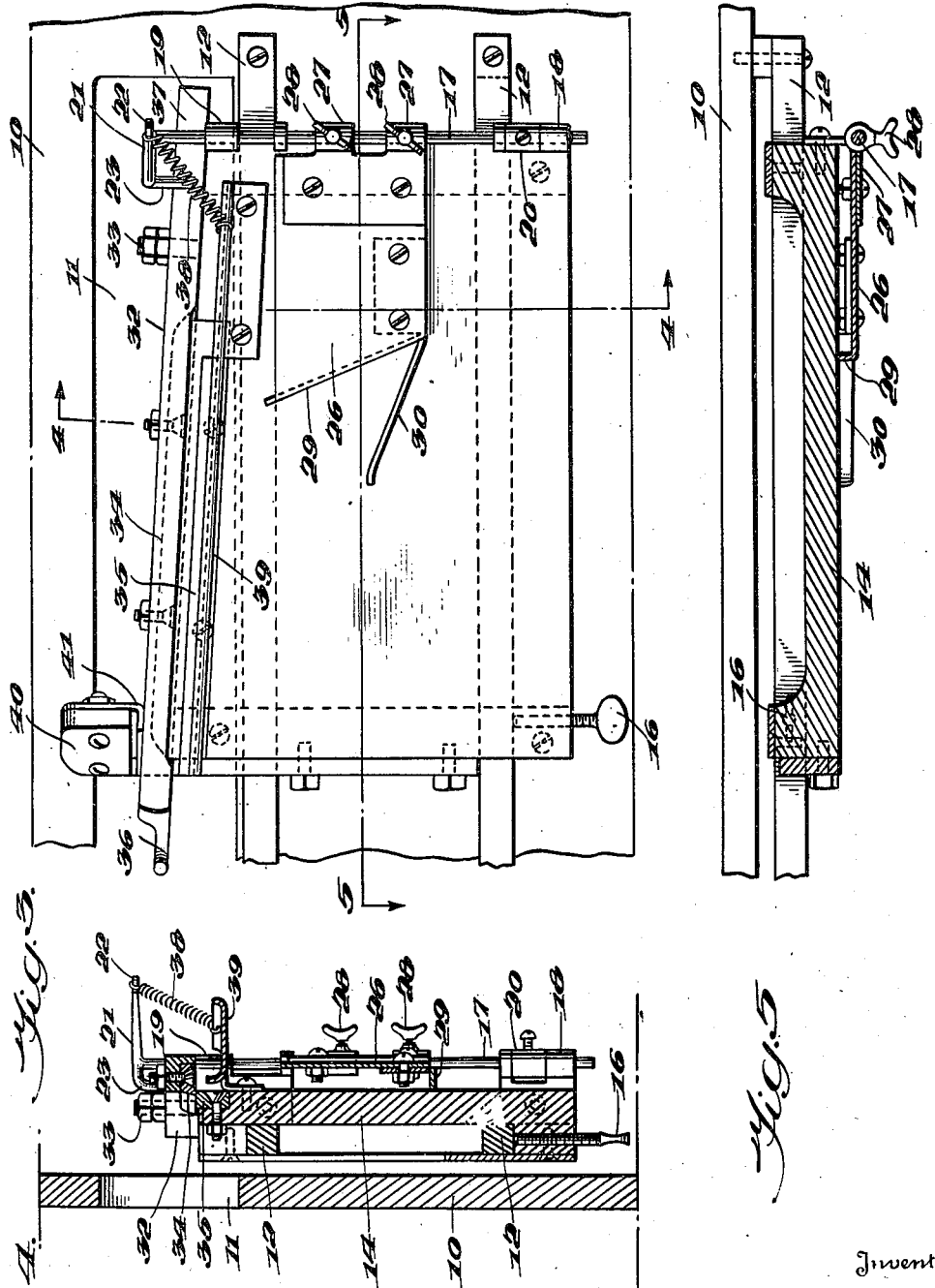

April 28, 1942.  R. W. DU VAL  2,281,422
CUTTING MACHINE
Filed Aug. 29, 1941  3 Sheets-Sheet 3
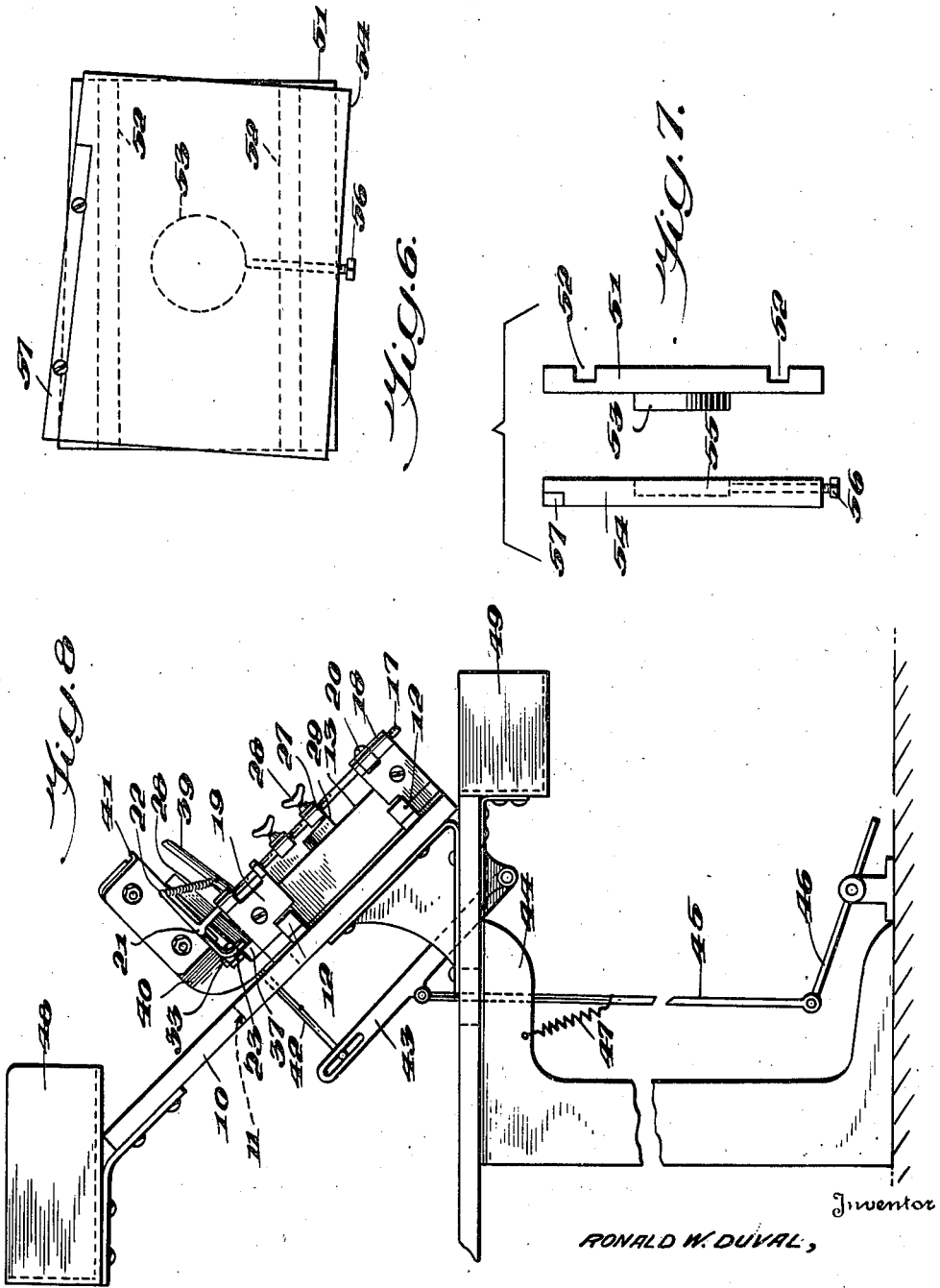
Inventor
RONALD W. DUVAL,
By Rinder & Rinder
Attorney Patented Apr. 28, 1942

2,281,422

UNITED STATES PATENT OFFICE 2,281,422

CUTTING MACHINE

Ronald W. Du Val, Petersburg, Va.

Application August 29, 1941, Serial No. 408,899

9 Claims. (Cl. 164—45)

This invention relates to cutting and trimming machines, and more particularly to cloth trimming apparatus well adapted for use in tailoring, and garment manufacturing establishments, and in the general manufacture of wearing apparel.

Specifically the invention comprises a trimming or shearing device designed to cut a work blank at a plurality of points to predetermined exact measurements, either simultaneously, or in continuous operation.

The illustrated embodiment is directed to a collar top trimming machine, wherein it is desired to trim the ends of the collar top to duplicate measurements, such that when fitted into a shirt, the collar ends will evenly match, i. e., have the same height as each other.

However, the invention is by no means limited to a collar trimmer, as obviously it will be readily applicable to use with cuffs, pocket blanks, lapels, shoe upper blanks, etc., in fact its range of utility is virtually unlimited. It is also contemplated that the machine may be made adjustable to trim at a plurality of points of variable dimension, i. e., where duplication of measurement in the work is not desired. Again, while a plurality of cutting blades or shears are illustrated the apparatus is so designed that a single cutter may be used to the exclusion of the remainder, when it is desired to trim at but a single location.

Heretofore, particularly in the trimming of collar tops, it has been customary to trim one end portion of the collar top to a given measurement and then attempt to trim the other to the same measurement. Sometimes this has been done by folding the collar blank in half and trimming both end portions of the collar top with a single cut. These operations have not always proved satisfactory, due to inequalities in the material, or to the extra labor entailed in cutting first the one point and thereafter the other. Accordingly, one of the objects of the present invention is to provide for cutting at a plurality of points with separate cuts, but to a single predetermined measurement, in one operation.

Another object is to provide a means which may be set to the predetermined measurement for a given run of work, whereupon successive work pieces may be quickly and accurately placed in the machine, trimmed, and automatically removed without the exercise of any particular skill on the part of an operator.

A further object comprehends the provision of a combined work support and gauge, which in addition to holding the work during the trimming operation, is settable accurately to the desired measurement of the finished work. It is contemplated that this work support will be so designed as to release the work automatically at the conclusion of the trimming operation, thus relieving the operator of need for removing the blank from the machine.

One of the primary and important objects of the invention is to provide a plurality of shears, adjustable to various fixed locations with respect to each other, thus enabling the machine to accommodate varying sizes of work, which shears may also be individually adjusted to various positions relative to each other, for the accommodation of varying shapes of work.

For a more complete description of the invention, and to the attainment of the foregoing and other objects which will appear as the description proceeds, reference may be made to the accompanying drawings in which:

Fig. 1 is a top plan view of the machine;

Fig. 2 is a rear elevation thereof;

Fig. 3 is a fragmentary plan view, somewhat enlarged, illustrating one of the cutting units in detail;

Fig. 4 is an irregular, transverse section on the line 4—4 of Fig. 3;

Fig. 5 is a longitudinal section, partly in elevation on the line 5—5 of Fig. 3;

Fig. 6 is a detail plan view illustrating a slight modification;

Fig. 7 is a disassembled view in elevation, showing the major elements of Fig. 6; and Fig. 8 is an end elevation of the complete machine assembled and mounted on a suitable table or bench.

Referring now more particularly to the drawings, wherein like reference numerals designate like parts, there will be found a base or bed 10, upon which the major operating parts are supported. This bed is provided with a longitudinally extending slot or opening 11 through which operating connections may extend, and to provide for the escape of cuttings. A pair of rails 12—12 extending lengthwise of the bed, in parallel relation to the slot 11 form a trackway for the mounting of the trimmer units, exemplified herein as a pair of knife or cutter carriages 13 and 14, each of which carries a complete cutting mechanism. The under sides of the carriages are suitably grooved to fit the rails 12, and either or both of the carriages may be arranged to slide along the trackway for adjustment purposes. One of the rails 12 may be calibrated, as indicated in Fig. 1, to work sizes, if found desirable. Preferably, one of the carriages, as 13 will be located in semi-permanent position by means of a set screw 15, and the other carriage 14 may be releasably adjusted to position by means of a wing bolt or thumb screw 16. In this manner the calibrations may be determined by reference to the fixed carriage 13.

A hinged pintle 17 extends across one end of the carriage 14, being mounted in suitable hinge brackets 18, 19 and locked against removal by a set screw and collar 20. An angle-shaped actuator arm 21 is formed upon or otherwise rigidly secured to the pintle 20, this arm terminating at one of its ends in a perforated extension 22 and at the other of its ends in a dog 23, the purposes of which are hereinafter described.

A combined work support and gauge plate 26 is rigidly, but adjustably, secured to the pintle 17 by means of a pair of collar brackets 27—27 and thumb screws 28—28. The plate 26 is formed with a flange 29 extending across one end thereof and partially around its periphery, and this flange serves not only to space the plate 26 from the working surface of the carriage 14, but also to provide an abutment or edge gauge against which the work may be positioned. The flange 29, is extended beyond the working end of the plate 26, as a flat finger 30; in the illustrated embodiment this finger 30 forms with that portion of the flange 29 which extends across the plate 26, an acute angle conforming substantially to the shape of the work, e. g., the point of a collar blank. Since the plate 26 is fast on the pintle 17, it will be apparent that the plate 26 will move to and from the surface of the carriage 14, as the pintle 17 is rocked, and it will also be clear that the entire plate 26 with its flanges may be adjusted along the length of the pintle 17 by means of the thumb screws 28.

A knife or cutter lever 32 is pivoted as at 33 to the side of the carriage 14. The lever is provided with a removable blade 34 of hardened steel or other material suitable for cutting purposes, in the illustrated embodiment by recessing the lever 32, and bolting the blade 34 as an insert in the recess. The carriage 14 may be similarly recessed along the side to which the lever 32 is pivoted for the reception of a mating knife block or blade 35, to form with the knife 34, a pair of shears. It follows that as the lever 32 with its blade 34 swings past the block 35 the shearing effect takes place.

The lever 32 is projected beyond the carriage, terminating in a hook or suitable connection 36 adapted to connect with actuating mechanism such as a treadle link arrangement, by means of which the lever 32 may be oscillated on its pivot.

The other end of the lever 32 is extended, as at 37, beyond the pivot 33, to engage the dog or angular projection 23 of the actuator arm 21, and thus serving as a means of rocking the pintle 17, in turn raising or lowering the plate 26 with respect to the surface of the carriage 14. A spring 38, connecting the perforating extension 22 of the actuator arm 21, to a guard member 39, serves to return the plate 26 and the pintle 17, after a rocking movement effected by the extension 37 engaging the dog 23.

The guard 39 is an upright shield positioned normal to the working surface of the carriage 14 over the blade or knife block 35, and slightly spaced from such blade. This guard or shield 39 serves the dual purpose of protecting an operator from injury by the cutting action of the blades, and of functioning as a guide for the positioning of work in a trimming operation.

An angular bracket 40 is secured across the forward end of the carriage 14, with one arm projecting above the surface of the carriage, in substantial parallel relation to the guard 39. This bracket forms a support for a blade guide 41, in the form of a plate, adjustably mounted on the support to extend along the path of movement of the shear blade 34, i. e., in rubbing engagement with the lever 32, as the lever moves toward and from the blade 35. By suitable adjustment of the guide 41, the lever 32 and hence the blade 34 can be maintained in constant shearing relation to the block or knife 35, without placing sole reliance upon the nuts which secure the lever 32 to the pivot 33.

The lever 32 is actuated by means of a link connected to the hook end 36 which may be in the form of a yoke 42 as illustrated, in order to connect the cutters of the two carriages 13 and 14, although obviously separate links may be provided for each carriage, should this be found more practical.

By reference to Fig. 8, it will be observed that the yoke 42 is connected to a lever 43 pivoted to a table or bench 44 which serves to support the trimming machine, the lever 43 being in turn connected by a treadle link 45 to a conventional treadle 46, preferably of the single heel and toe type. If desirable, although it is not essential, a treadle spring 47 may be provided to restore the treadle to a normal position after it has been actuated.

The trimming machine is preferably mounted upon the table 44 at approximately a forty-five degree angle, such that the working surfaces of the carriages 13 and 14 are conveniently positioned to the operator, but this angle is arbitrary and may be varied as desired. A magazine 48 for supplying work blanks may be mounted above the machine, and a receptacle 49 for receiving trimmed work pieces may be secured to the table or bench 44 below and adjacent the machine.

The cutter arrangement described with respect to the carriage or unit 14 will find its counterpart on the carriage unit 13, and since all parts for the unit 13 duplicate those of the unit 14, even to the treadle linkages, no detailed description thereof is necessary.

Having thus described the invention, the operation thereof will be readily apparent. The magazine 48 provides a supply of blanks, e. g., shirt collars which have been made and finished, except for the edge portion which is to be attached to the shirt. This edge portion is to be trimmed such that the ends of the collar from point to edge are of the same dimension. With the carriage 14 and gauge support 26 properly adjusted relative to the carriage 13 and its members for the size of work to be trimmed, the operator positions a blank across the machine with one end in the angle formed by the finger 30 and flange 29 on the carriage 14; and the other end correspondingly positioned on the carriage 13. The edge to be trimmed is placed under the guards 39 of the respective carriages, the levers 32 being, of course, in a raised position. The machine is then treadled to trim the edge of the blank beneath the guards 39, and as the levers 32 begin to approach their lowermost, cutting position, the extensions 37 at the other ends thereof engage the dogs 23, to rock the pintles 17. Rocking of the pintles raises the plates 26 away from the surfaces of the carriages 13 and 14, thus removing all support for the work blank which has been resting upon the flat fingers 30. This permits the trimmed blank to drop automatically into the receiver 49, whereupon the operator releases the treadle, restores the cutters to their inoperative position, and through the medium of the springs 38, causes the gauge supports 26—30 to return to a contacting relation with the surfaces of the respective carriages 13 and 14.

As has been pointed out heretofore, the plates or gauge supports 26 each are adjustable along the pintles 17 to accommodate different widths of work, and the carriages 13 and 14 are adjustable toward and from each other to accommodate different lengths or sizes of work. For most standard work blanks, the angularity of cut along the edge to be trimmed will be constant, and the carriages can ordinarily be provided with a fixed taper from end to end, which will take care of the work, regardless of its length or width. As can be readily observed from Figs. 1 and 3, this taper is very slight, the tables being just a little bit wider at their inner or forward ends than at the outer ends where the pintles 17 are located.

However, it might be desirable in some instances to provide for adjustment of the degree of taper in order to handle specialized work, for example, as in the case of a dress collar which is trimmed with a concavity at the back. As one feasible mode of providing such an adjustment, the carriages 13 and 14 may be constructed in two relatively adjustable parts instead of as a single block. Such a construction is shown in Figs. 6 and 7, wherein the carriage base is formed as a block 51, suitably grooved as at 52—52 for engagement with the rails 12—12, just as in the case of the unitary carriages 13 and 14. The base 51, however, will be provided with a boss or protuberance 53, forming a mounting for a turntable and working surface 54. The table 54 will be formed with a mating recess 55 shaped to conform to the protuberance 53, whether the protuberance be cylindrical or polygonal, and a set screw 56 extending through the table 54 will serve to maintain same in any adjusted position. The table 54 will function for all purposes of one of the carriages 13 and 14 and the the entire cutting mechanism described in connection with the carriage 14 will be mounted thereon. A shear blade or block 57, corresponding to the block or blade 35, heretofore described, will be inset into the edge of the table 54. The modification of Figs. 6 and 7 is to all intents and purposes, identical with the form of the invention shown in the other figures, except that it provides for additional adjustment, by means of which the trimming taper may be varied.

Having thus fully described my invention, what I claim as new and desire to secure by Letters Patent of the United States is:

1. In a trimming machine, the combination of a bed, shearing means carried thereby, work retaining means normally positioned on said bed adjacent said shearing means for holding the work in position to be trimmed, automatically operable means to move said retaining means from a work holding position to release the work after a trimming operation, and means to adjust the relative position of said retaining means and said shearing means to accommodate varying work.

2. In a trimming machine, the combination of a frame, a bed mounted thereon, shearing means carried by said bed, work retaining means normally positioned on said bed adjacent said shearing means for holding the work in position to be trimmed, means to move said retaining means from a work holding position to release the work after a trimming operation, and means to adjust said bed angularly with respect to said frame to accommodate varying shapes of work.

3. In a trimming machine, the combination of a frame, a bed mounted thereon, shearing means carried by said bed, work retaining means normally positioned on said bed adjacent said shearing means for holding the work in position to be trimmed, means to move said retaining means from a work holding position to release the work after a trimming operation, and means to adjust said bed angularly and linearly with respect to said frame to accommodate varying shapes and sizes of work.

4. In a trimming machine, the combination of a frame, a bed mounted thereon, shearing means carried by said bed, work retaining means normally positioned on said bed adjacent said shearing means for holding the work in position to be trimmed, means to move said retaining means from a work holding position to release the work after a trimming operation, and means to adjust said bed angularly and linearly with respect to said frame and means to adjust the relative position of said retaining means and shearing means, to accommodate varying shapes and sizes of work.

5. In a trimming machine, the combination of a bed, shearing means carried thereby, work retaining means normally positioned on said bed adjacent said shearing means for holding the work in position to be trimmed, said work retaining means including gauging means for accurately positioning the work with respect to the shearing means.

6. In a trimming machine, the combination of a bed, shearing means carried thereby, work retaining means normally positioned on said bed adjacent said shearing means for holding the work in position to be trimmed, said work retaining means including gauging means for accurately positioning the work with respect to the shearing means, and means to move said retaining means from a work holding position to release the work after a trimming operation.

7. In a trimming machine, the combination of a bed, shearing means carried thereby, work retaining means normally positioned on said bed adjacent said shearing means for holding the work in position to be trimmed, said work retaining means including gauging means for accurately positioning the work with respect to the shearing means, and automatically operable means to move said retaining means from a work holding position to release the work after a trimming operation, and to return said retaining means to its original work gauging position.

8. In a trimming machine, the combination of a frame, a pair of work-receiving beds mounted for relative adjustment toward and from each other to accommodate different sizes of work, a trimming mechanism comprising a movable knife and a fixed knife carried by each of said beds, work retaining and positioning means pivotally mounted adjacent each of said movable knives, means to actuate said movable knives, means to move each of said work retaining means out of a work retaining position after a trimming operation, and means to adjust the angle of the respective beds on the frame, to accommodate different shapes of work.

9. In a trimming machine, the combination of a frame and bench, said frame comprising a wall extending upwardly at an inclination from said bench, a pair of work-receiving beds mounted on said inclined wall, for relative adjustment toward and from each other to accommodate different sizes of work, a trimming mechanism comprising a movable knife and a fixed knife carried by each of said beds, work retaining and positioning means movably mounted adjacent each of said pairs of knives, means to actuate said movable knives and to move each of said work retaining means out of a work retaining position after a trimming operation comprising a treadle linkage extending through said inclined wall, said wall being slotted to permit the passage therethrough said treadle linkage, as well as to facilitate escape of cuttings from the work, and said inclined wall having a supply magazine for work blanks at its upper portion, and a trough for the reception of trimmed blanks at its lower portion.

RONALD W. DU VAL.